United States Patent [19]
Haagen

[11] Patent Number: 6,164,717
[45] Date of Patent: Dec. 26, 2000

[54] WIND DEFLECTOR FOR A VEHICLE SUNROOF

[75] Inventor: Thomas Haagen, Langenselbold, Germany

[73] Assignee: Meritor Automotive, GmbH, Frankfurt, Germany

[21] Appl. No.: 09/336,860

[22] Filed: Jun. 21, 1999

[51] Int. Cl.⁷ ....................................................... B60J 7/22
[52] U.S. Cl. ............................................................. 296/217
[58] Field of Search ............................................. 296/217

[56] References Cited

U.S. PATENT DOCUMENTS

| | | | |
|---|---|---|---|
| 4,482,183 | 11/1984 | Grimm et al. | 296/217 |
| 5,178,436 | 1/1993 | Eberius et al. | 296/217 |

FOREIGN PATENT DOCUMENTS 0210124  9/1987  Japan ...................................... 296/217

*Primary Examiner*—Dennis H. Pedder
*Attorney, Agent, or Firm*—Carlson, Gaskey & Olds

[57] ABSTRACT

A wind deflector (4) for the roof opening (2) of a motor vehicle which can be closed by a displaceable panel (3), moved out into the displayed operating position by means of spring resistance. An articulated linkage arrangement (15), on which the spring resistance acts, is situated on each display arm (7) of the wind guide profile (6), these supporting the wind deflector (4) on the roof frame (9), whereby, on the one hand, the display force to be overcome during the panel closing displacement is reduced and, on the other hand, a vibration-resistant state is achieved for the wind deflector (4) in the operating position.

14 Claims, 4 Drawing Sheets

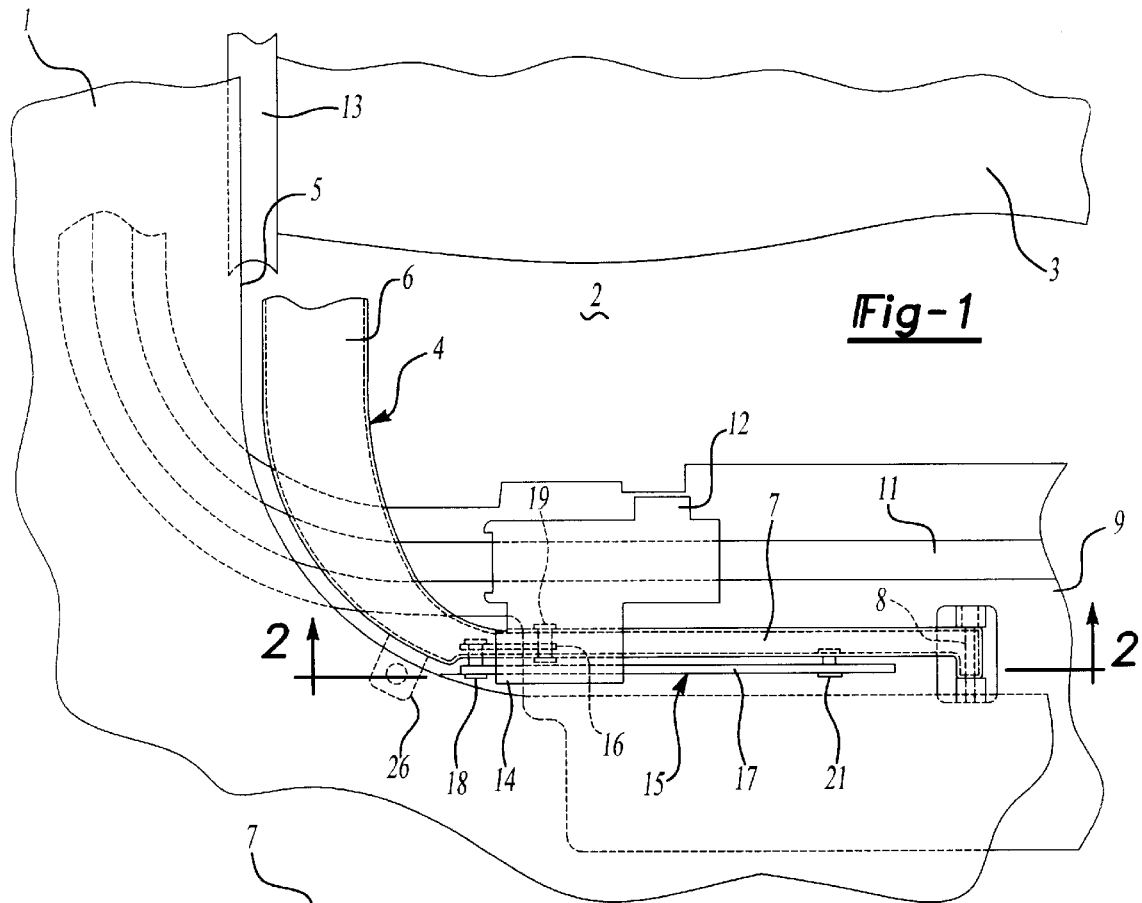
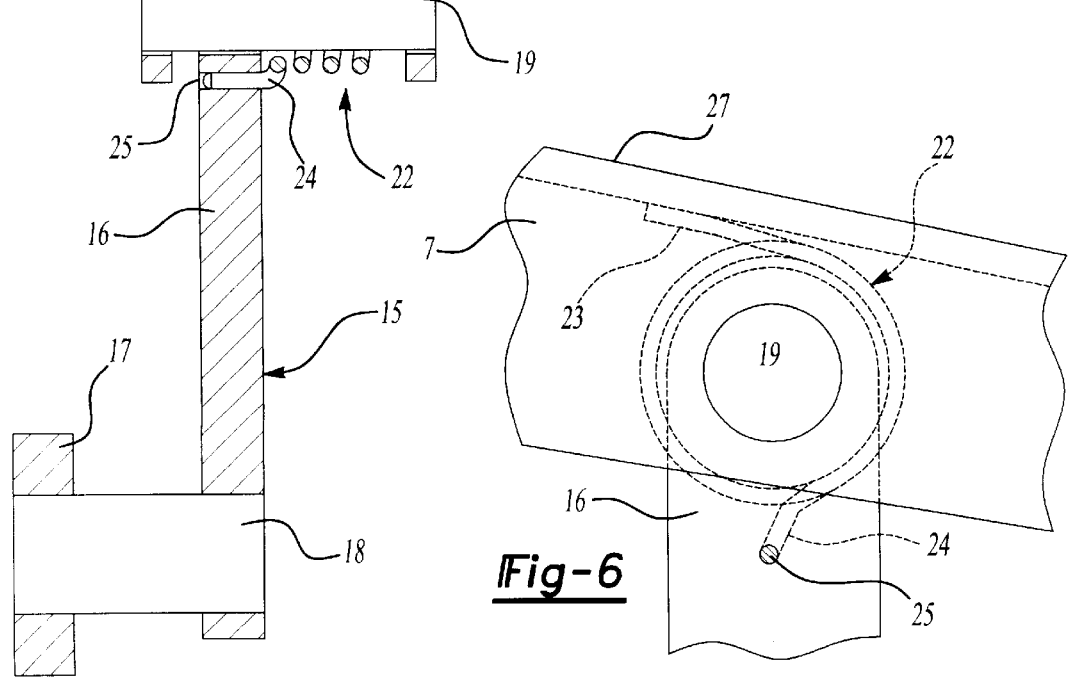

WIND DEFLECTOR FOR A VEHICLE SUNROOF

BACKGROUND OF THE INVENTION

The invention concerns a wind deflector for the roof opening of a motor vehicle. The roof opening is closable by means of a sliding panel. Such a deflector has a forward wind guiding profile and rearwardly extending arms which are pivoted to the vehicle body below the opening. The deflector is resiliently biased to rise and project through the opening when the panel is displaced rearwardly.

Different formats of wind deflectors of this kind are known, and these can be divided into two groups. The wind deflectors of one group (e.g. DE 26 07 816 C3, DE 35 17 067 C2, DE 39 06 903 A1, DE 44 09 484 C1) have in common the fact that the resilient bias is generated by springs, one end of which engages directly with the wind guide profile, while the other end acts against a rigid roof part. In wind deflectors of the other group (e.g. DE 43 23 694 C1, DE 44 46 016 C1) the resilient bias is generated by flat springs which engage with the pivotally mounted arms and act against the roof frame.

In the known wind deflector designs, the wind force acting on the projecting wind deflector during travel causes the deflector to vibrate against the spring bias. This can lead to interfering movement of the wind deflector and to unwanted noise. Moreover, large spring biases which, in themselves, act against the said vibrations can lead to malfunctioning of the panel as it closes, elements moved with the panel colliding with the arms of the deflector and skewing these in the direction of a lower end position. Large spring biases may require unreliably large panel closing forces.

SUMMARY OF THE INVENTION

The present invention provides a wind deflector which, when in its projecting position, cannot vibrate against the spring bias and which requires no unreliably high closing force. To this end the rearwardly extending arms are resiliently biased upwards by means of a short link and a long link articulated to the short link, a spring acting to cause the short link connected to or adjacent to a said arm to cause the wind guide profile to move upwards, the spring acting on the short arm and the end of long arm not connected to the short arm being connected to the arm by means of a sliding connection. The whole arrangement being such that when the panel opens the wind guide profile projects through the roof opening.

The aforesaid articulated linkage arrangement, in conjunction with the attachment location and the application of force by the helical spring on the articulated linkage arrangement on the one hand and on the arm on the other, means that a situation is achieved according to the invention whereby the wind deflector, in its displayed and projecting operative position which is caused by the spring bias, has a vibration-resistant upright position, supporting itself by means of the articulated linkage arrangement on the roof frame. In the slide-to-close movement of the panel, the articulated link arrangements attached at either side are to be brought to an extended position against the spring resistance for lowering the wind deflector into its idle position. This requires comparatively low forces, so that the panel closing forces cannot adopt any unreliably high closing force values.

During the slide-to-close movement, the articulated linkage arrangement first experiences a linkage displacement against the spring bias in the direction of the extended position of the articulated linkage arrangement, as a result of the element which acts on the long link and is displaceable with the panel, before the element which is displaceable with the panel acts directly on the arm.

The articulated linkage arrangement provides a particularly stable configuration in the operating position of the wind deflector, in which the short link is directed approximately perpendicular to the roof frame.

BRIEF DESCRIPTION OF THE DRAWINGS

Further details of the invention are explained in more detail below on the basis of the drawings representing a preferred embodiment. The drawings show:

FIG. 1 the curtailed and opened up top view of a vehicle roof with closed panel and wind deflector in idle position, FIG. 2 curtailed longitudinal section through the vehicle roof according to Line II—II in FIG. 1, FIG. 3 a curtailed longitudinal section through the vehicle roof similar to that of FIG. 2, but with a front opening gap between panel and vehicle roof and a corresponding intermediate position of the wind deflector, FIG. 4 a curtailed longitudinal section through the vehicle roof similar to those in FIGS. 2 and 3, but with wind deflector displayed in its operating position and a closed position of the panel which the latter adopts immediately before the start of the swivel-in movement, FIG. 5 section through the articulated linkage arrangement according to Line V—V in FIG. 4 and FIG. 6 a curtailed detail of the articulated linkage arrangement in side view according to circle VI in FIG. 4.

DESCRIPTION OF THE PREFERRED EMBODIMENT

Figure 2:
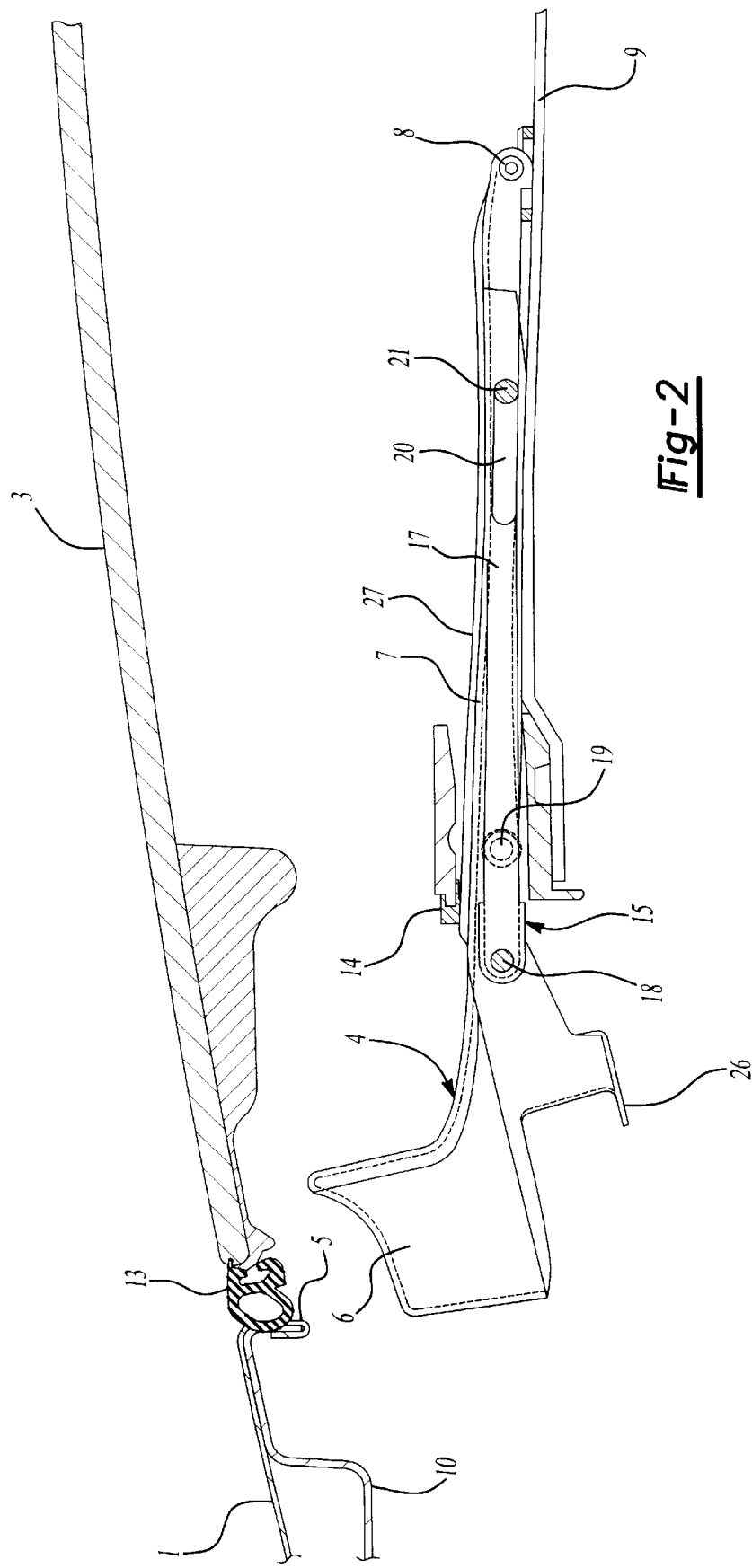

FIGS. 1 to 4 show, among other things, a rigid vehicle roof 1, a roof opening 2 in this, a slidable or slide-and-lift panel 3, which is assigned to the roof opening, configured in the embodiment as a glass panel, and a wind deflector, generally indicated by the reference number 4. In the area of the front edge 5 and parallel to this is an extended wind guide profile 6 of the wind deflector 4. A display arm 7 is permanently attached to each end of the wind guide profile 6. Both display arms 7, only one of which is shown in FIG. 1, since the arrangement is symmetrical, run parallel to one another and are arranged on each side of the roof opening 2.

The display arms 7 can be pivoted at their rear ends, remote from the wind guide profile 6, around an axis which runs parallel to the front edge 5 of the roof opening 2, this axis being formed by swivel pins 8. The display arms 7 are linked by means of the swivel pins 8 to a roof frame 9, indicated only in curtailed form in FIGS. 1 to 4, which underpins the roof opening 2, and connected via roof reinforcement profiles 10, only the front of which is shown in curtailed form in FIGS. 2 to 4, to the vehicle roof 1 in a permanent manner.

The panel 3 is guided displaceably in the usual manner, using front and rear guide shoes arranged in pairs, along guide rails 11 attached laterally to the roof frame 9. Only one of the two lateral guide rails 11 and only one front guide shoe 12 can be seen in FIG. 1. A more detailed explanation of these functional parts and the associated drive system for the panel 3 is not required here since these are appropriately known arrangements which this invention does not concern.

The panel 3 may be formed from metal sheet. The sealing of the closed panel (FIGS. 1, 2) is provided by an edge gap sealing profile 13 attached to the panel 3. Each of the front guide shoes 12 has a carrier 14 which participates with the guide shoe 12 in all displacement movements of the panel 3 and collaborates with the wind deflector 4 in a manner to be described.

An articulated linkage arrangement 15 is attached symmetrically, in the manner to be described in more detail below, to the wind deflector 4 on both display arms 7. The articulated linkage arrangement 15 is formed from a short link 16 and a long link 17. Both links 16, 17 are connected to one another at one of their ends in a jointed manner by a link pin 18. The other end of the short link 16 is connected in a pivoting manner to the corresponding display arm 7 in the vicinity of the wind guide profile 6 by means of a further link pin 19. At the other end of the long link 17 is a guide slot 20, which runs parallel to the longitudinal direction of the lever and in which a guide pin 21, attached to the display arm 7 in the vicinity or the swivel pin 8, engages. Guide slot 20 and guide pin 21 form a toggle link mechanism.

Figure 4:
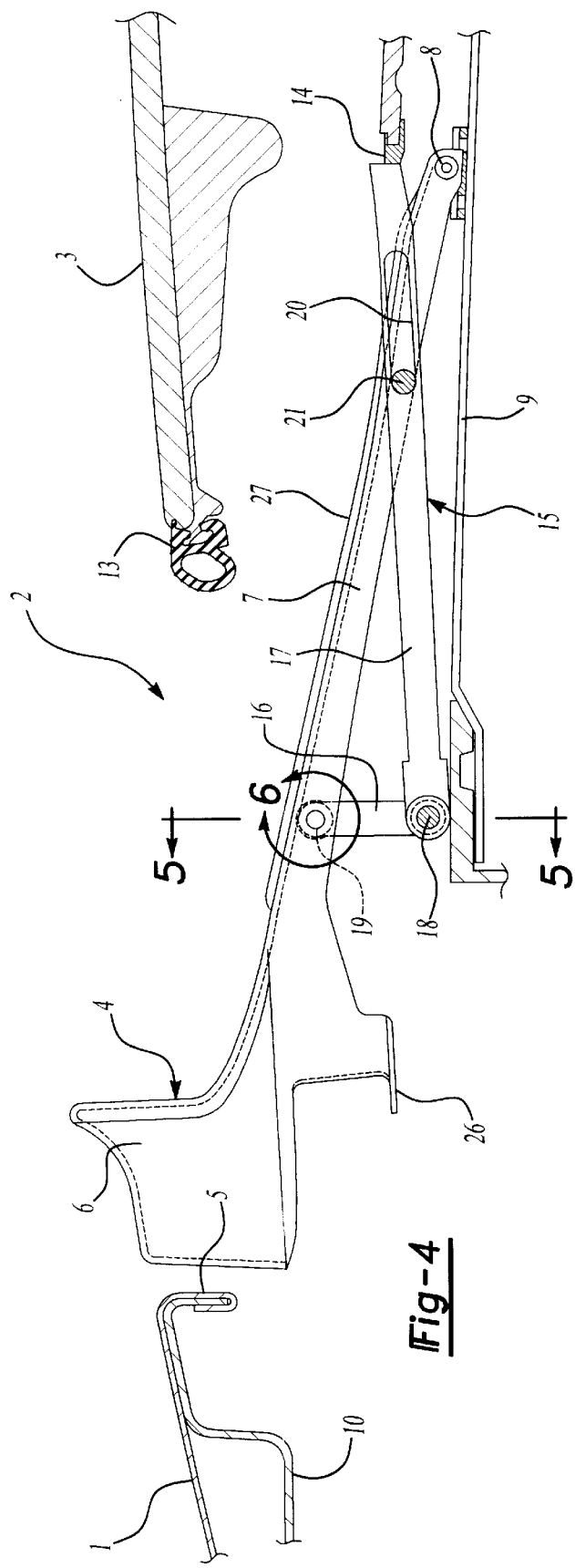

FIG. 4 shows the articulated linkage arrangement 15 in its maximum upright position, which corresponds to the operating position of the wind guide profile 6 and in which it supports itself on the roof frame 9 with its articulation point situated between the two links 16, 17. Here the short link 16 is in a stabile position, approximately perpendicular to the roof frame 9, while the guide pin 21 is situated at the end of the guide slot 20 nearest the link pin 18. This position of the articulated linkage arrangement, shown in FIG. 4, is maintained through spring resistance, which ensures that the wind deflector 4 remains in its displayed operating position.

The spring resistance is generated by a helical spring 22 which is positioned on the articulated joint between the short link 16 and the display arm 7 around the link pin 19. As is shown very clearly in FIGS. 5 and 6, one leg 23 of the helical spring 22 supports itself against the display arm 7, while the other leg 24 is supported on the short link 16, engaging in a location bore hole 25. The helical spring 22 is configured and arranged in such a manner that, when the panel 3 is displaced in the direction of its open position, the articulated linkage arrangement 15 moves the wind guide profile 6 out into its displayed operating position. In the operating position, the wind deflector 4 lies against the rigid vehicle roof 1 from below via the stops 26 which are attached on each side of the wind deflector (FIG. 1). In the operating position of the wind deflector, the helical spring 22 is still under prestressed, stabilising the operating position.

Figure 3:
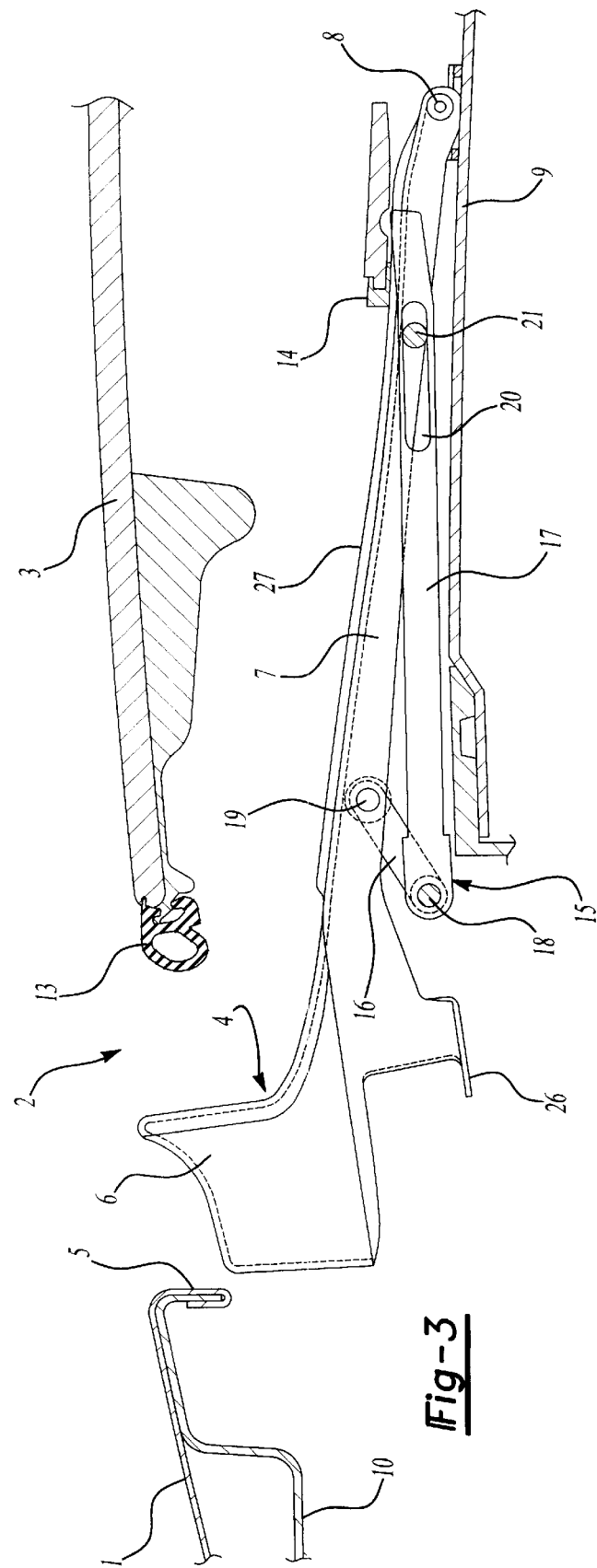

If the panel is moved in the close direction, the carrier finally meets the outer end of the long link 17 of the articulated linkage arrangement 15. This situation is shown in FIG. 4. If the slide-to-close movement of the panel 3 is continued, the contact of the carrier 14 with the outer end of the long link 17 means that the latter is displaced against the spring resistance of the helical spring 22, lowering the wind guide profile. The display arm 7 pivots around its swivel pin 8, and the long link 17 pivots around the link pin 18, the guide slot 20 being displaced relative to the guide pin 21. In this way, continuation of the closing displacement movement of the panel 3 gradually causes the contact surface between the carrier 14, moved parallel to the guide rail 11, and the rear or outer end of the long link 17 to be reduced and finally cancelled out. At this moment, the carrier 14 runs onto a slide track situated on the display arm 7, which means that, with continued closing displacement of the panel 3, the carrier 14 acts directly on the display arm 7 so that this pivots further downwards around the swivel pin 8. An intermediate phase of this displacement and pivot situation is shown in FIG. 3.

When the panel 3 reaches its closed position, shown in FIG. 2, the carrier is at the front end of the slide track 27 causing the wind deflector 4 to be pivoted against the force of the helical spring 22 to its idle position. Here the wind guide profile 6 is situated below the panel 3. With the opening displacement of the panel 3, the outlined movement processes occur in reverse order. The carrier 14 which is displaced backwards with the panel 3 slides onto the slide track 27 and, in doing so, increasingly approaches the swivel pin 8, which means that the articulated linkage arrangement 15 is gradually released and moved to an upright position as a result of the spring resistance of the helical springs 22, until finally the position of parts shown in FIG. 4 is again reached.

The articulated linkage arrangement 15, in the operating position with the display arm shown in FIG. 4, approximately adopts the form of a right-angled triangle, the angle situated between the two links 16 and 17 being approximately 90°.

The invention proposes a wind deflector for the roof opening of a motor vehicle which can be closed by a displaceable panel, in which the movement into the displayed operating position takes place through spring resistance. An articulated linkage arrangement is situated on each display arm of the wind guide profile of the wind deflector, spring resistance acting on these and these supporting the wind deflector on the roof frame, whereby, on the one hand, the display force to be overcome during the panel closing displacement is reduced and, on the other hand, a vibration-resistant state is achieved for the wind deflector in the operating position.

It should be apparent to those skilled in the art that the embodiment described heretofore is considered to be the presently preferred form of this invention. Accordingly changes may be made in the disclosed construction without departing from the true spirit and scope of the invention as defined in the accompanying and appended claims.

What is claimed is:

1. A wind deflector for a roof opening of a motor vehicle, comprising:
   a wind guide profile pivotally mounted to the vehicle, said wind guide profile movable between an upper position above said roof opening and a lower position below said roof opening;
   a short link pivotally attached to said wind guide profile;
   a long link pivotally attached to said short link and slidably connected to said wind guide profile;
   a biasing member attached between said short link and said wind guide profile to bias said wind guide profile toward said upper position.

2. The wind deflector according to claim 1, wherein said short link and said long link are disposed at an approximate 90 degrees angle when said wind guide profile is biased toward said upper position.

3. The wind deflector according to claim 1, wherein said wind guide profile is pivotally mounted to the vehicle at a wind guide profile pivot, said long link slidably attached to said wind guide profile adjacent said wind guide profile pivot.

4. The wind deflector according to claim 1, wherein said long link includes a slot and said wind guide profile includes a guide pin, said guide pin slidably mounted within said slot.

5. The wind deflector according to claim 1, further comprising a displaceable panel movable between an open position and a closed position, said displaceable panel operable to overcome said biasing member to pivot said wind guide profile toward said lower position when said displaceable panel is displaced toward said closed position.

6. The wind deflector according to claim 1, wherein said biasing member is under stress when said wind guide profile is in said upper position.

7. A wind deflector for a roof opening of a motor vehicle, comprising:
- a wind guide profile having an arm pivotally mounted to the vehicle, said wind guide profile pivotable between an upper position above said roof opening and a lower position below said roof opening;
- a short link pivotally attached to said wind guide profile;
- a long link pivotally attached to said short link and slidably connected to said wind guide profile, said long link having a slot and said wind guide profile having a guide pin, said guide pin slidably mounted within said slot;
- a biasing member attached between said short link and said wind guide profile to bias said wind guide profile toward said upper position.

8. The wind deflector according to claim 7, wherein said short link, said long link, and said arm form an approximate right-angle triangle such that an angle disposed between said long link and said short link define an approximate 90 degrees angle when said wind guide profile is biased toward said upper position.

9. The wind deflector according to claim 7, wherein said short link is pivotally attached to said arm at a link pin, said biasing member attached to said link pin and said arm to bias said wind guide profile toward said upper position.

10. The wind deflector according to claim 9, wherein said biasing member is a helical spring.

11. The wind deflector according to claim 7, wherein said biasing member is under stress when said wind guide profile is in said upper position.

12. The wind deflector according to claim 7, further comprising a displaceable panel movable between an open position and a closed position such that said displaceable panel is operable to overcome said biasing member to pivot said wind guide profile toward said lower position when said displaceable panel is displaced toward said closed position.

13. The wind deflector according to claim 7, further comprising a displaceable panel movable between an open position and a closed position such that said displaceable panel contacts a slide track of said arm to overcome said biasing member to pivot said wind guide profile toward said lower position when said displaceable panel is displaced toward said closed position.

14. The wind deflector according to claim 7, further comprising a displaceable panel movable between an open position and a closed position such that said displaceable panel contacts said long link to overcome said biasing member and pivots said wind guide profile toward said lower position when said displaceable panel is displaced toward said closed position until said displaceable panel contacts a slide track of said arm and releases said long link such that said displaceable panel continues to pivot said wind guide profile toward said lower position when said displaceable panel is displaced toward said closed position.

* * * * *